United States Patent Office 2,900,384
Patented Aug. 18, 1959

2,900,384

ARYLOXYALKYLHYDRAZINIUM CHLORIDES

Bernard Rudner, Baltimore, Md., assignor to W. R. Grace & Co., New York, N.Y., a corporation of Connecticut No Drawing. Application May 2, 1956
Serial No. 582,085

11 Claims. (Cl. 260—247.5)

This invention relates to a class of organic compositions which contain a substituted hydrazine, and, more particularly to a class of quaternary salts known as hydrazinium salts. In one specific aspect it relates to a class of chemical compounds which are ethers of quaternized hydrazines. In another specific aspect, it relates to a new class of compounds which may be called aryloxyalkylhydrazinium salts.

Heretofore, hydrazinium salts have been available only in limited quantities. Their development as commercially valuable products has been impeded by the fact that their preparation was dependent upon the use of expensive and hard-to-obtain substituted hydrazines. In many cases, the availability of these reactants depended upon a tedious preparation from hydrazine itself. Other routes to the desired substituted hydrazine presented an equal amount of difficulty.

It has been recently discovered that chloramine reacts with tertiary amines to form 1,1,1-trisubstituted hydrazinium chlorides. This reaction presents practically limitless possibilities for the preparation of new and interesting chemical compounds, which, because of the characteristics inherent in their structure and physical properties have a wide range of uses. Tertiary amines are readily available bases. Chloramine is an excellent reagent which can be economically obtained in commercial quantities by using the well-known process of Harry H. Sisler et al., described in U.S. Patent No. 2,710,248, where chlorine and ammonia are reacted in the vapor phase to produce chloramine (monochloramine). Using the chloramine-tertiary amine reaction, I have discovered a new class of hydrazinium salts.

The value of the chloramine-tertiary amine reaction can be strikingly demonstrated by comparing an earlier possible commercial preparation of one of my unique products (Reaction Sequence A) with this new preparative method (Reaction Sequence B):

(A)

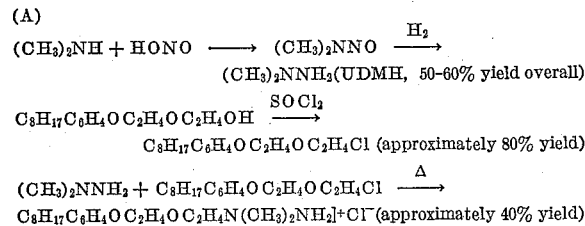

(B)

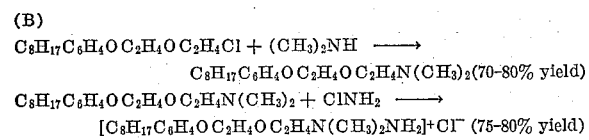

Thus the new sequence not only utilizes cheaper intermediates, but does so more effectively, in a simpler set of reactions more amenable to the isolation of a relatively pure product.

It is therefore an object of the present invention to provide a new generic class of quaternized nitrogen compounds, the aryloxyalkylhydrazinium salts which can be produced in commercial quantities.

In accordance with the present invention, I have found a novel, useful generic class of hydrazinium salts having the general formula:

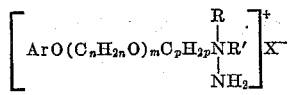

In the above formula, Ar includes phenyl and substituted phenyl radicals. The term "substituted" embraces alkyl, alkoxy, nitro, and halo substituents. R and R' can be either alkyl or aralkyl radicals, or they may be taken collectively to complete a heterocyclic structure having 5 or 6 endocyclic atoms. R and R' may also be substituted aralkyl radicals; the term "substituted" is used as defined hereabove. $n$ and $p$ are small whole numbers, generally up to and including 10. $m$ is a whole number value of from 0 to 3. X is the anion of an acid at least equal to carbonic acid in strength.

In practicing my invention, for example, the desired tertiary amine can be produced where necessary by reacting the applicable halide with the desired secondary amine. Often, however, the tertiary bases are commercially available. A gaseous mixture of chloramine and ammonia, with or without added diluent such as nitrogen may then conveniently be bubbled into a solution of the tertiary amine. This solution may be aqueous or anhydrous, depending on the preferred conditions for the particular amine to be used as a reactant. An unreactive organic solvent may be used to form an anhydrous solution. The term "unreactive" as applied to the solvent is intended to embrace those solvents that do not react preferentially with ammonia, chloramine, or the tertiary amine selected under the conditions employed. In addition, a liquid amine may serve as its own reaction medium. In anhydrous solution, the desired hydrazinium salt generally precipitates as the reaction proceeds. If aqueous media are employed, the reaction mixture generally of necessity is concentrated or evaporated to dryness in order to obtain the desired hydrazinium salt. The solid can be recovered and purified by conventional laboratory procedures. In a slight modification of the above procedure, chloramine may be added in stabilized aqueous solution. See Inorganic Syntheses, vol I, pp. 59–62, McGraw-Hill, New York (1939).

Such tertiary amines as shown in Table I may be used to prepare some of the particular species of my generic class. Compounds thus prepared falling within the scope of my invention are also shown in Table I.

TABLE I

| Amine | Product |
|---|---|
| (1) 2-Phenoxypropyldiethylamine. | 1,1-Dietheyl-1-(2-phenoxypropyl)hydrazinium chloride. |
| (2) 4-Phenoxybutyldimethylamine. | 1,1-Dimethyl-1-(4-phenoxybutyl)hydrazinium chloride. |
| (3) 2-(p-Nitrophenoxy)ethylmorpholine. | 1-Amino-1-[2-(p-nitrophenoxy)ethyl] morpholinium chloride. |
| (4) (2,4-di-t-butylphenoxy)ethylpyrrolidine. | 1-Amino-1-[2-(2,4-di-t-butylphenoxy)-ethyl]pyrrolidinium chloride. |
| (5) 2-Dimethylaminoethylbenzodioxane. | 1,1-Dimethyl-1-[2-(2'-benzodioxanyl)-ethyl]hydrazinium chloride. |
| (6) 1,2-bis-(2-Dimethylaminoethoxy)benzene. | Benzene-1,2-bis[(oxyethyl-2'-dimethyl)]hydrazinium chloride. |
| (7) t-Octylphenoxydiethoxyethyldipropylamine. | 1,1-Dipropyl-1-[2-(β''-t-octylphenoxy-β'-ethoxy-β-ethoxy)ethyl]hydrazinium chloride. |
| (8) p-t-Octylphenoxyethoxyethylmethyldichlorobenzylamine. | 1-Methyl-1-(2,5-dichlorobenzyl)-1-[2-(p-t-octylphenoxyethoxy)ethyl]hydrazinium chloride. |
| (9) p-t-Octyl-m-cresoxyethoxyethylpiperidine. | 1-Amino-1[2-(p-t-octyl-m-cresoxyethoxy)ethyl]piperidinium chloride. |

Alternatively these, and other similar useful compounds can be prepared from the novel hydrazinium salts derived from haloalkyl-tertiary amines, viz:

(C)

$Cl(C_nH_{2n}O)_mC_pH_{2p}NRR' + ClNH_2 \longrightarrow$

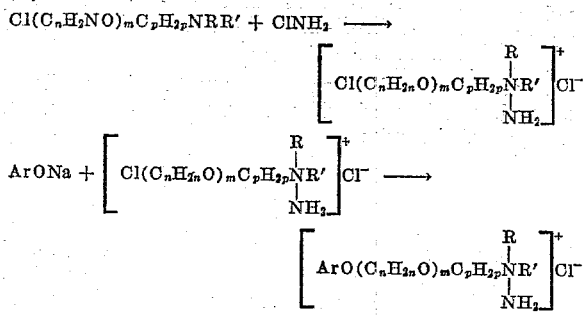

This alternate synthesis is especially suitable where the phenolic group is an active one, as in

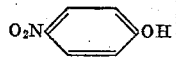

and where R and R' are moderately bulky groups, e.g. isopropyl. The choice of preparative method (C vs. B) depends, in the final analysis, on the availability of intermediates and efficiency of reactions.

I have also found that addition of chloramine to aralkylalkyl ethers derived from tertiary amino alcohols has led to the production of useful pharmaceuticals. For example, the hydrazinium chloride derived from benzhydryloxyethyldimethylamine has been found to be an antihistaminic agent approximately three times more effective (by aerosol test) than the commercial antihistamine sold under the trade name Benadryl.

My invention is further illustrated by the following examples:

Example I

A chloramine generator was constructed to produce a gas stream containing chloramine, using the aforementioned process of Sisler et al. The gaseous mixture of chloramine, ammonia, and nitrogen so obtained was passed into a solution of 50 ml. 4-t-octylphenoxyethoxyethyldimethylamine in 50 ml. mixed xylenes for almost 88 minutes. The ensuing exothermic reaction caused the temperature of the mixture to rise from 28° C. to 57° C., and remain there during the run. Because of the marked increase in viscosity of the clear mixture as reaction progressed, it was necessary to add 50 ml. more xylene thirty minutes after starting, and an additional 30 ml. half an hour later. Shortly after this second xylene addition, the reaction mixture slowly turned milky and started to foam. Chloramine absorption was almost quantitative (i.e., less than 5% of the chloramine generated passed through the reaction mixture unchanged) and its conversion was rapid. Within thirty minutes after gasification had been stopped, all of the chloramine had reacted. The mixture was allowed to sit overnight, during which time it formed a somewhat viscous, uniform dispersion of two liquids and a solid. Since this was not amenable to separation by common procedures, it was evaporated to a thick white cream. This was washed with limited quantities of cold xylene to remove unconverted amine, and then extracted with absolute alcohol. Evaporation of the ammonium chloride-free solution gave a soft white paste, which was purified by extraction with anhydrous acetone and subsequent evaporation of the solution thus formed. The soft, light-tan paste so obtained could not be solidified by trituration with solvents, or evaporation in vacuo over $P_2O_5$. However, on being seeded with the white solid obtained as described hereafter in Example III, the paste was converted to a soft light tan wax, M.P. 92–95°. The novel product was almost chemically pure 1,1-dimethyl-1-[2(4-t-octyl-phenoxyethoxy)-ethyl] hydrazinium chloride.

This desirable product is a soft, microcrystalline wax with a rather oily feel. It is very soluble in water; its aqueous solutions foam copiously on agitation, and feel soapy on the skin. It is also soluble in alcohol, acetone, and chloroform; less so in ether, xylene and the paraffinic hydrocarbons. Its aqueous solutions yield, on treatment with the proper reagents, water-insoluble salts with numerous organic and inorganic anions. Among these are a flocculent white hydrazinium hexafluorophosphate, M.P. 76° C., a pinkish-white diliturate, M.P. 188–190° C., a white iodide, M.P. 176–178° C., a colorless thiocyanate, and a curdy, off-white salt with sulfathiazole. The novel hydrazinium chloride also gives precipitates with many anion-active compounds, including sodium oleate, sodium laurylsulfate, and Congo red.

Example II

The amine used in Example I, 5 g., was suspended in 95 ml. of 5% $NH_4OH$ at 10–15° by the addition of a dispersing agent of alkylnaphthaline-sulfonic acid type (Tamol NNO) and good agitation. To this was added dropwise, over three hours, a chilled solution of 0.5 g. chloramine in 100 ml. water, prepared according to the directions in Inorganic Syntheses. The mixture was stirred at 10–15° for an additional hour, and then at room temperature for the remainder of 2 days. Although most of the active chloride had disappeared within 24 hours, and all within 48, the mixture still contained some unreacted amine. The mixture was charcoaled and evaporated to dryness in an air-stream. The largely solid residue was washed with cold hexane, then extracted with chloroform. Evaporation of this tan extract gave less than a 30% yield of crude 1,1-dimethyl-1-[2-(4-t-octylphenoxyethoxy)ethyl] hydrazinium chloride, identified as its hexafluorophosphate, M.P. 72–74° C.

Example III

The procedure of Example I was substantially repeated, using 0.281 mole (100 g.) of commercial 4-t-octyl-phenoxyethoxyethyldimethylamine in 1000 ml. of n-heptane and 0.404 mole of chloramine from an essentially nitrogen-free gas stream. During the reaction, over 87% of the product precipitated out as a waxy white solid. Conversion figures for both amine and chloramine were very good. After two recrystallizations from n-heptane, the product, 1,1-dimethyl-1-[2-(4-t-octylphenoxyethoxy)ethyl] hydrazinium chloride was obtained as a gleaming white wax, M.P. 102–103° C., 99% pure by chloride titration.

Example IV

A mixture of (3-methyl-4-t-octylphenoxy)ethoxyethanol, 5 g., and 25 ml. thionyl chloride gave, on refluxing 45 minutes, the corresponding chloride. This product, on degassing at 50° C. in a stream of nitrogen, was isolated as a reddish oil, crude octylcresoxyethoxyethyl chloride. The crude oil, in 20 ml. (washed and dried) carbon tetrachloride, was mixed with a similar solution of benzylmethylamine, 2.2 equivalents, allowed to stand for six days, and then subsequently refluxed for two hours. The cooled solution, after being filtered, washed, and dried, was freed of solvent and then vacuum distilled to give 2.1 g. of yellowish benzylmethyl-(3-methyl-4-t-octylphenoxy)ethoxyethylamine. The preparation reactions "D" are given below. This tertiary amine, in 50 ml. n-hexane, was subjected to a chloramine stream, as described in Example I, for 30 minutes. The mixture of oil and solid which precipitated during the mildly exothermic reaction was shown to consist of the desired product, 1-benzyl-1-methyl-1-[2-(4-t-octyl - 3 - methylphenoxyethoxy)ethyl] hydrazinium chloride and a larger quantity of ammonium chloride. Extraction with chloroform and subsequent evaporation gave an ammonium chloride-free oil which could not be converted to a solid by standard physical procedures. Its hexafluorophosphate and picrate were both oils, and its tan diliturate decomposed over the range 221–229° C. It formed a low-melting salt with the sodium salt of benzylpenicillin.

(D)
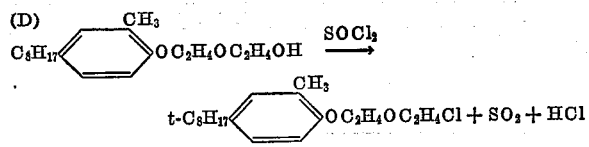

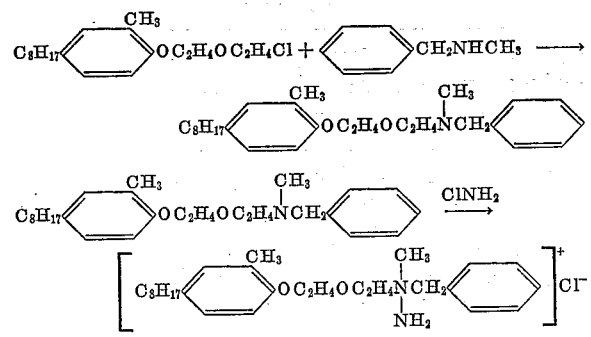

*Example V*

An anhydrous solution of sodium p-cresoxide and sodium propoxide (prepared from 0.02 mole of phenol and 0.022 mole sodium in 250 ml. anhydrous 2-propanol) was treated portionwise at reflux temperature, with a suspension of 0.02 mole of 1,1-dimethyl-1-(2-chloroethyl)hydrazinium chloride in 10 ml. anhydrous 2-propanol, over a period of 30 minutes. The mixture was refluxed for 4 hours more, allowed to cool overnight, then filtered free of the near-quantitative yield of NaCl. Evaporation of the filtrate gave a light brown gum plus a darker brown liquid; repeated trituration with pre-dried ether converted this mixture to a gum. Recrystallization first from 2-propanoldioxane mixtures, then from a chloroform-dioxane mixture, gave off-white prisms of 1,1-dimethyl-1-(2-p-cresoxyethyl)hydrazinium chloride, M.P. 129–130° C. (see Reaction Sequence E).

This novel product is a water-soluble solid with a bitter taste, appreciably soluble in alcohol and chloroform, slightly soluble in acetone, and relatively insoluble in ether, dioxane, and hydrocarbons. Its aqueous solutions on treatment with the proper reagents, yield a colorless hexafluorophosphate, M.P. 186–187.5° C.; and a yellow picrate, needles, M.P. 152–152.5° C. Refluxing a dry 2-propanol solution of the hydrazinium chloride product (Reaction Sequence E) with 1.05 equivalents of sodium lactate gave, as precipitate, a 92% yield of sodium chloride and, as propanol-soluble product, hygroscopic plates of 1,1-dimethyl-1-(2-cresoxyethyl)hydrazinium lactate, which was soluble in approximately its own weight of water (Reaction F). This product, and the parent chloride, formed the same salt with aspirin, M.P. 163–165°, (d.) (see Reaction G below):

(E)
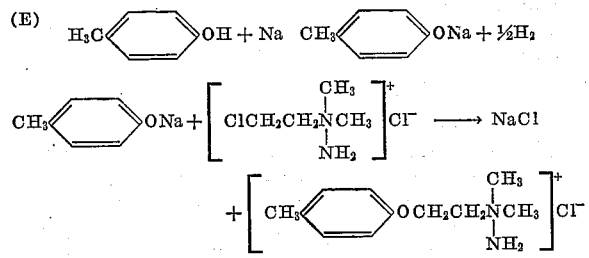

(F)
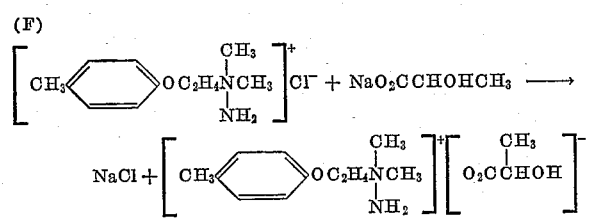

(G)
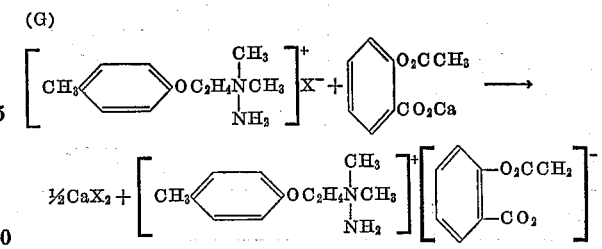

*Example VI*

A solution of 0.02 mole (4 g.) of 1-(2-chloroethoxy)-2-phenoxyethane in 30 ml. dried benzene was treated with 0.04 mole (2.9 g.) pyrrolidine in 20 ml. benzene. The mixture allowed to stand for several days. Filtration gave a 72% yield of pyrrolidine hydrochloride. The filtrate was washed with water, then extracted with two 50 ml. portions of 5% HCl. The combined acid extract, on being made alkaline, gave a 68% yield of crude N-[β-(2-phenoxyethoxy)ethyl]pyrrolidine. The amine, 1.1 g. in 20 ml. of chloroform, was dried over anhydrous magnesium sulfate 30 minutes and then decanted. The clear, light brown decantate was subjected to treatment with a total of 0.3 g. chloramine from a chloramine-ammonia gas stream. The solid that precipitated was found to be a mixture of ammonium chloride and 1 - amino - 1 - [2-(β - phenoxyethoxy)ethyl]pyrrolidinium chloride, in a roughly 5:1 proportion. The mixture, extracted with absolute ethanol together with this extract evaporated to dryness, gave tan crystals of the desired pyrrolidinium chloride, M.P. 180–185° C., (d.). Evaporation of the reaction filtrate gave additional crude product as an oil, which in addition contained unreacted amine. The overall yield, from chloroether through amine to hydrazinium chloride, was slightly less than 30%.

In a larger scale exepriment, the benzene solution was refluxed for three hours, cooled, filtered, washed with water, dried over anhydrous magnesium sulfate, and then treated directly with a chloramine gas stream. The precipitate from the mildly exothermic reaction was an off-white, crystalline mixture of ammonium chloride and aminophenoxyethoxyethyl-pyrrolidinium chloride in approximately a 1:1.5 weight ratio. The product, purified by recrystallization from methanol-dioxane and ethanol-dioxane mixtures, melted with decomposition at 192–193° C. It was readily soluble in water, appreciably soluble in alcohol, and relatively insoluble in acetone and ethers. Its aqueous solutions did not yield a precipitate of a hexafluorophosphate, but did form a water-insoluble picrate, subl. 135–155°; M.P. >250° C. The overall yield was 58% of the theoretical.

*Example VII*

From 3-bromopropoxybenzene and two equivalents of morpholine in dry benzene was obtained (by a procedure similar to those of the preceding examples) a 72% yield of 4-(3-phenoxypropyl-1)morpholine. Reaction of this product in dry chloroform with chloramine gave a 75% yield of 4-amino-4-(3-phenoxypropyl - 1)morpholinium chloride, as a fluffy off-white solid containing a small amount of ammonium chloride. Extraction of the crude product (which melted over a range of 180–190° C.) with absolute alcohol, and recrystallization from alcohol-dioxane mixture, gave glistening, fine needles of 4-amino-4 - (3 - phenoxypropyl - 1)morpholinium chloride, M.P. 183–184° C., after undergoing a phase change and sintering at 120–121° C. The crystalline product was very soluble in water and markedly soluble in ethyl and isopropyl alcohol. It was relatively insoluble in ethers and hydrocarbons. Its aqueous solutions gave a hexafluorophosphate, small stubby needles, M.P. 109–110° C., and water-insoluble oily yellow picrate.

By standard procedures such as described above there have been prepared many other similar compounds, including those listed in Table II, below. Those listed are of two types, the hydrazinium chlorides, prepared directly from chloramine, and other hydrazinium salts. The starting base, the name of the product, and relevant comments are all included in Table II.

stearate, and 2-ethylhexanoate are effective slime-inhibitors in non-aqueous systems, and are therefore useful, e.g. in the drilling and maintenance of oil wells.

As specific examples of the above outline can be cited the effectiveness of two compounds, the chloride (water-

Table II

| Example | Base | Product | Comments |
|---|---|---|---|
| VIII | 6-allyl-2-methoxy-1-(2-diethylaminoethoxy)benzene. | 1,1-diethyl-1-[2-(6-allyl-2-methoxyphenoxy)ethyl]hydrazinium chloride. | Made in benzene, yield poor. Salt, M.P. 153-154.5° C, d. |
| IX | p-Cresoxyethylpiperidine | 1-amine-1-[2-(p-cresoxy)ethyl]piperidinium chloride. | Product and picrate oils. |
| X | p-Nonylphenoxyethyl-diethylamine | 1,1-diethyl-1-[2-(p-nonylphenoxy)ethyl]hydrazinium chloride. | Thick yellow oil picrate on oil. |
| XI | Chloride of Example I and sodium stearate. | 1,1-dimethyl-1-[2(4-t-octylphenoxyethoxy)ethyl]hydrazinium stearate. | Water-insoluble powder in 63-66° C. |
| XII | Chloride of Example I and aspirin | 1,1-dimethyl-1-[2(4-t-octylphenoxyethoxy)ethyl]hydrazinium (2-acetoxy)benzoate. | M.P. 146-147° C. (long needles). |
| XIII | Chloride of Example VII and penicillin. | 4-amino-4-(3-phenoxy-propyl-1-)morpholinium penicillinoate. | Hygroscopic, M.P. 172-174° C. |
| XIV | Chloride of Example VI and silver mandelate. | 1-amino-1-[2-(β-phenoxy-ethoxy)ethyl]pyrrolidinium mandelate. | Plates, d., 201-204° C. |
| XV | Chloride of Example IV and sodium cetylsulfate. | 1-benzyl-1-methyl-1-2-(3-methyl-4-t-octylphenoxy)-ethoxyethyl hydrazinium cetylsulfate. | Waxy powder from alcohol, M.P. 52-55° C. |

My novel class of compounds has a wide range of actual and potential uses, which vary with the chemical structure and physical properties of the individual members of the class. This can be illustrated by reference to the general formula given for my new genus:

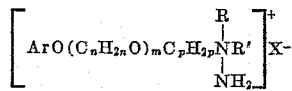

The most versatile products are those where Ar is an aryl—chiefly phenylnucleus substituted by a higher alkyl group, preferably para to the ether linkage. Such compounds, e.g. the p-t-octylphenoxy derivatives, are potent anti-bacterial agents. I have found marked powers of antisepsis among those of my products which have the following structural requirements:

(1) Ar contains, as described above, a higher alkyl group para to the ether linkage. It may also contain other smaller groups such as a nuclear methyl group or nuclear chlorine atom.

(2) $n=2$, $p=2$, and $m=1$. The first two of these requirements are a matter of economics. The isopropoxy compounds

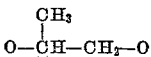

although effective are more expensive and less accessible. The n-propoxy compounds are far too expensive to prepare. Antimicrobial action apparently goes through a sharp maximum at $m=1$.

(3) R and R' are lower alkyl; or R is lower alkyl and R' a benzyl or nuclear chlorinated benzyl, or R and R' together make a nitrogenous heterocycle. Variations from one to another of these sub-types show less qualitative effect on bacteriostatic and antifungal action than does alteration of a like number of carbon atoms elsewhere in the cation. As a matter of largely commercial practicality, the dimethylamine and diethylamine derivatives ($R=R'=CH_3$ or $R=R'=C_2H_5$) are currently most desirable, since they are, at present, cheapest to produce.

(4) There is less effect, in varying X, on the anti-microbial power than there is on the physical properties. As a matter of practicality again, $X=Cl$ is most desirable for water-soluble antiseptics, since this product is directly obtained by use of the chloramine-tertiary amine reaction. Except for the slight additional cost of preparing them, the water-soluble nitrates, lactates, acetates, phosphates, etc. are equally desirable products. Even the less-soluble sulfates, oxalates, and picrates are antiseptic. The water-insoluble, organic solvent-soluble salts, e.g. the tallate, soluble) and sulfathiazole salt (water-insoluble) of the 1,1-dimethyl-1-(p-t-octylphenoxyethoxy)ethylhydrazinium cation. When tested by the Oxford cup procedure the hydrazinium chloride was found to be especially effective, at 0.01% concentration, against M. pyrogenes, E. coli, M. gypsum and Ch. globusum. It was slightly less effective, but still strongly anti-microbial, against P. aeruginosa, S. marcesens, K. pneumoniae, and C. albicans, under the same test conditions. The sulfathiazole salt, to which I have ascribed the structural formula:

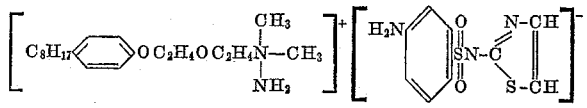

showed less pronounced maximal activities, but a broader spectrum of positive action.

My novel compounds having this and similar structural formulas are excellent surfactants. I have found that I can vary the structure more widely for excellent surfactant properties than I can for anti-microbial activity. Thus, while Ar is the same for both types, n and m can be varied through wider limits for surface tension depressants than for antiseptics. The foaming power and soapy feeling of solutions of some of my compounds have already been mentioned. As measured by Draves test, the octylphenoxyethoxyethyl and octylcresoxy hydrazinium compounds, regardless of the nature of R and R', showed very high wetting power. This high surfactant action makes two compounds useful not only as detergent-sanitizer ingredients but as dispersants, emulsifying agents, and additives in textile processing, dyeing, ore beneficiation, electrowinning, and electroplating. I have reacted my surfactant salts with acidic dyes and acidic pharmaceuticals, forming in the first case, bright water-insoluble, solvent-soluble lacquer dyes and in the second case, water-dispersible, self-sterilizing pharmaceuticals.

Actual utility is not limited to those of my novel compounds in which Ar is an aryl residue substituted by a higher hydrocarbon. I have found that those of my novel products in which Ar contains no large hydrocarbon substituent, and $m=0$, are potent medicinals. Specifically, the product of Example VIII, 1,1-diethyl-1-[2-(6-allyl-2-methoxyphenoxy)ethyl]hydrazinium chloride and the corresponding lactate, are anti-histaminics equal to the commercially available Gravitol and Tastromine. The products of Examples VI, VII and IX possess some anti-histaminic activity, but are much more active as anticholinergic compounds. The latter two compounds approach the alkaloidal medicinals in this respect.

I claim:
1. A new chemical compound, 1,1-dimethyl-1[2-(4-t-octylphenoxyethoxy)ethyl]hydrazinium chloride.
2. A new chemical compound, 1-benzyl-1-methyl-1-[2 - (4-t-octyl-3-methylphenoxyethoxy)ethyl]hydrazinium chloride.
3. A new chemical compound, 1,1-dimethyl-1-(2-p-cresoxyethyl)hydrazinium chloride.
4. A new chemical compound, 1-amino-1-[2-(β-phenoxyethoxy)ethyl]pyrrolidinium chloride.
5. A new chemical compound, 4-amino-4-(3-phenoxypropyl-1)morpholinium chloride.
6. Chemical compounds having the general formula:

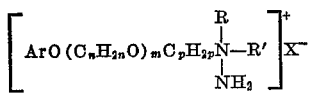

wherein Ar is a member selected from the group consisting of phenyl, alkyl-phenyl and alkoxy-phenyl in which the alkyl carbons of the alkyl-phenyl and alkoxy-phenyl members total less than 10; $n$ and $p$ are small whole numbers of at least 2 and not more than 5; $m$ is a whole number of value less than 4; R is lower alkyl; R' is a member selected from the group consisting of lower alkyl, benzyl and chlorobenzyl; R and R' taken together with the N on which they are both substituents complete a heterocycle selected from the group consisting of pyrrolidine, piperidine and morpholine; and X is an anion of an acid stronger than carbonic acid.

7. Compounds according to claim 6 wherein R and R' are lower alkyl, Ar is 4-t-octylphenyl, $n=2$, $m=1$ and $p=2$.
8. Compounds according to claim 6 wherein R is lower alkyl, R' is benzyl, Ar is 3-methyl-4-t-octylphenyl, $n=2$, $m=1$ and $p=2$.
9. Compounds according to claim 6 wherein R and R' are lower alkyl, Ar is 4-methylphenyl, $m=0$ and $p=2$.
10. Compounds according to claim 6 wherein R and R' together with N form the pyrrolidine ring, Ar is phenyl, $n=2$, $m=1$ and $p=2$.
11. Compounds according to claim 6 wherein R and R' together with N form the morpholine ring, Ar is phenyl, $m=0$ and $p=3$.

References Cited in the file of this patent

Protiva et al.: Chem. Listy, vol. 47, pp. 1038–40 (1953), as abstracted in 49 Chem. Abstracts, 247–8 (1955).